(12) United States Patent
Slaney et al.

(10) Patent No.: US 8,923,621 B2
(45) Date of Patent: Dec. 30, 2014

(54) FINDING ENGAGING MEDIA WITH INITIALIZED EXPLORE-EXPLOIT

(75) Inventors: Malcolm Slaney, Palo Alto, CA (US); Bee-Chung Chen, Mountain View, CA (US); Deepak K. Agarwal, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 239 days.

(21) Appl. No.: 13/434,738

(22) Filed: Mar. 29, 2012

(65) Prior Publication Data

US 2013/0259379 A1 Oct. 3, 2013

(51) Int. Cl.
*G06K 9/46* (2006.01)
(52) U.S. Cl.
USPC ........... 382/190; 707/707; 707/758; 707/759; 707/760; 707/765
(58) Field of Classification Search
CPC ............... G06T 2207/10016; G06F 17/30864; G06F 17/30867
USPC ........... 382/190; 707/707, 758, 759, 760, 765
See application file for complete search history.

(56) References Cited

U.S. PATENT DOCUMENTS

| 2010/0121624 A1 | 5/2010 | Roy et al. |
| 2010/0125585 A1 | 5/2010 | Chu et al. |
| 2010/0191689 A1 | 7/2010 | Cortes et al. |
| 2010/0241597 A1 | 9/2010 | Chen et al. |
| 2011/0054999 A1* | 3/2011 | Attenberg et al. ......... 705/14.43 |

FOREIGN PATENT DOCUMENTS

WO 2010026297 A1 3/2010

OTHER PUBLICATIONS

Wang et al: "Boosted multi-task learning for face verification with applications to web images and video search", IEEE, 2009.*
Filip Radlinski et al., "Learning Diverse Ranking with Multi-Armed Bandits", Proceedings of the 25th International Conference of Machine Learning (Helsinki, 2008).
Deepak Argawal et al., "Explore-Exploit Schemes for Web Content Optimization", 9th IEEE International Conference on Data Mining 2009 (Dec. 2009).
PCT/US2013/034470, International Search Report and Written Opinion of the International Searching Authority, Jun. 28, 2013.

* cited by examiner

*Primary Examiner* — Ruiping Li
(74) *Attorney, Agent, or Firm* — Martine Penilla Group, LLP

(57) ABSTRACT

Software for initialized explore-exploit creates a plurality of probability distributions. Each of these probability distributions is generated by inputting a quantitative description of one or more features associated with an image into a regression model that outputs a probability distribution for a measure of engagingness for the image. Each of the images is conceptually related to the other images. The software uses the plurality of probability distributions to initialize a multi-armed bandit model that outputs a serving scheme for each of the images. Then the software serves a plurality of the images on a web page displaying search results, based at least in part on the serving scheme.

20 Claims, 9 Drawing Sheets

$$\int 401 \quad \begin{aligned} & E[N_0(xp_0 + (1-x)q_0) + N_1(x_1p_1 + (1-x_1)q_1)] \\ & = E[N_0 x(p_0 - q_0) + N_1 x_1(p_1 - q_1)] + q_0 N_0 + q_1 N_1 \end{aligned}$$

- $N_0$, $N_1$: number of user visits at time 0 and 1.
- $q_0$, $q_1$: CTR of the *certain* item at time 0 and 1.
- $p_0 \sim \mathcal{P}(\theta_0)$, $p_1 \sim \mathcal{P}(\theta_1)$ are CTR distributions of the *uncertain* item at time 0 and 1 respectively.
- $x$, $x_1$ are the fractions of user visits allocated to the uncertain item at time 0 and 1; $(1-x)$ and $(1-x_1)$ are the fractions allocated to the certain item.
- $c$, a random variable, denotes the number of clicks that the uncertain item gets at time 0.

Figure 4

FINDING ENGAGING MEDIA WITH INITIALIZED EXPLORE-EXPLOIT

BACKGROUND

As computing has become more mobile, client devices have shrunk in size, leaving little "real estate" on which to display text and images. This problem is particularly acute for images to be displayed on a faceted search engine result page (SERP), since most of the SERP is given over to textual search results. Thus, only a few images can be meaningfully shown in a SERP displayed on a client device such as a smartphone.

Ideally, these few images will include images that are relatively engaging, when compared to other images of the same subject. However, identifying engaging images in an automated fashion is difficult, even when the images are of celebrities and click-through data for the images is plentiful. When the subject of the images is less famous and click-through data for the images is sparse, human editors tend to be used instead of automation.

SUMMARY

In an example embodiment, a processor-executed method is described. According to the method, software for initialized explore-exploit creates a plurality of probability distributions. Each of these probability distributions is generated by inputting a quantitative description of one or more features associated with an image into a regression model that outputs a probability distribution for a measure of engagingness for the image. Each of the images is conceptually related to the other images. The software uses the plurality of probability distributions to initialize a multi-armed bandit model that outputs a serving scheme for each of the images. Then the software serves a plurality of the images on a web page displaying search results, based at least in part on the serving scheme.

In another example embodiment, an apparatus is described, namely, a computer-readable storage medium which persistently stores a program. The program might be a module in software for initialized explore-exploit. The program creates a plurality of probability distributions. Each of these probability distributions is generated by inputting a quantitative description of one or more features associated with an image into a regression model that outputs a probability distribution for a measure of engagingness for the image. Each of the images is conceptually related to the other images. The program uses the plurality of probability distributions to initialize a multi-armed bandit model that outputs a serving scheme for each of the images. Then the program serves a plurality of the images on a web page displaying search results, based at least in part on the serving scheme.

Another example embodiment also involves a processor-executed method. According to the method, software for initialized explore-exploit creates a plurality of probability distributions. Each of these probability distributions is generated by inputting a quantitative description of one or more features associated with a video into a regression model that outputs a probability distribution for a measure of engagingness for the video. Each of the videos is conceptually related. The software uses the plurality of probability distributions to initialize a multi-armed bandit model that outputs a serving scheme for each of the videos. Then the software serves a plurality of the videos on a web page displaying search results, based at least in part on the serving scheme.

Other aspects and advantages of the inventions will become apparent from the following detailed description, taken in conjunction with the accompanying drawings, which illustrate by way of example the principles of the inventions.

BRIEF DESCRIPTION OF THE DRAWINGS

FIG. 4 shows a formula relating to a k-armed bandit model based on Bayesian inference, in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

One goal of the functionality described below is to find the most engaging image to go with any other piece of content (e.g., a web page, a description of a restaurant, or to illustrate a person), in the context of faceted search results. In an example embodiment, the functionality attempts to achieve this goal by looking for an image that produces relatively more mouse clicks than other related images. One might think of a mouse click as representing a request by the user for more information. Bad images will not reflect the user's interests, while good images will pique the user's interests. This is especially true for images used in conjunction with faceted search results, since only a small amount of screen "real estate" is used to summarize each search result.

Generally speaking, a relatively more engaging image of a person might show a face, while a relatively more engaging image of a restaurant might show a restaurant's ambiance. In an example embodiment, the functionality described below strives to learn the features of an engaging image through click-through data, which is a source of truth for the user's behavior. Click-through data associated with images tends to be more abundant for more popular search results, such as A-list celebrities and popular restaurants. More data makes for better models. But there are many search queries that will not have abundant click-through data associated with images. Thus, in an example embodiment, the functionality describe below trains an initial model to judge relatively more engaging images of persons on data for A-list celebrities and then uses the trained model to predict relatively more engaging images for C-list celebrities.

In example embodiments, there might be enough available click-through data to train separate models for movie celebrities as opposed to sports celebrities, male movie celebrities as opposed to female movie celebrities, old female movie celebrities as opposed to young female movie celebrities, etc. In this regard, it will be appreciated that relatively more engaging images for sports celebrities who are curling athletes might look considerably different than relatively more engaging images of sports celebrities who are beach-volleyball athletes. On the other hand, there might not be much difference in more relatively engaging images of sports celebrities who are male hockey players and more relatively engaging images of sports celebrities who are female hockey players, since hockey players are often photographed in uniforms that only leave their faces exposed.

Figure 1:
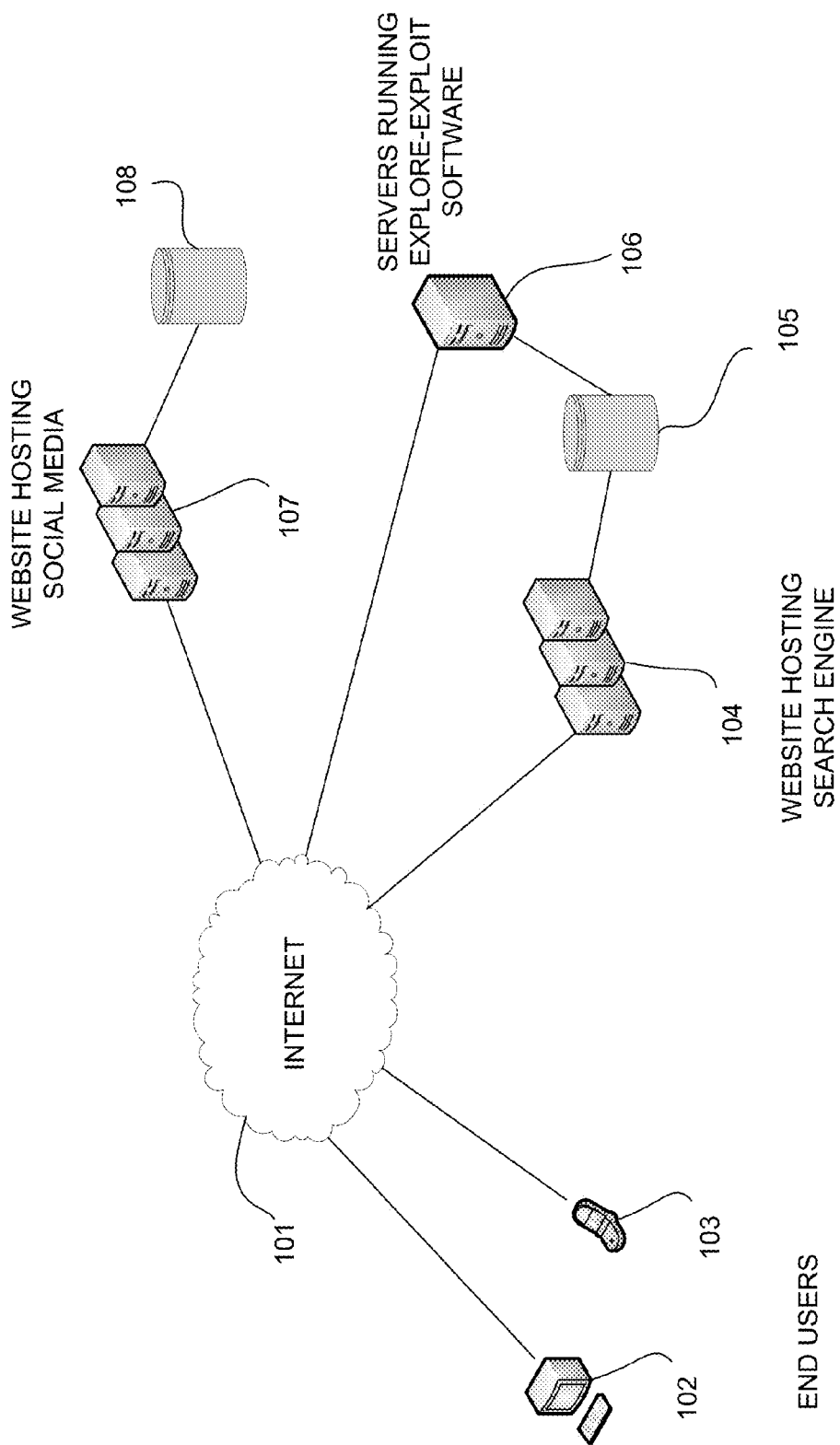
FIG. 1 is a simplified network diagram that illustrates a website hosting a faceted search engine, in accordance with an example embodiment.

FIG. 1 is a simplified network diagram that illustrates a website hosting a faceted search engine, in accordance with an example embodiment. As depicted in this figure, a personal computer 102 (e.g., a laptop or other mobile computer) and a mobile device 103 (e.g., a smartphone such as an iPhone, Android, Blackberry, etc., or a tablet computer such as an iPad, etc.) are connected by a network 101 (e.g., a wide area network (WAN) including the Internet, which might be wireless in part or in whole) with a website 104 hosting a search engine which supports faceted search, among other types of search. In an example embodiment, personal computer 102 and mobile device 103 might be used by end users who submit queries to the faceted search engine at website 104.

In an example embodiment, website 104 is composed of a number of servers connected by a network (e.g., a local area network (LAN) or a WAN) to each other in a cluster or other distributed system which might run search-engine software, website software (e.g., web server software, database software, etc.), and distributed-computing and/or cloud software such as Map-Reduce, Google File System, Hadoop, Pig, CloudBase, etc. The servers are also connected (e.g., by a storage area network (SAN)) to persistent storage 105. Persistent storage 105 might include a redundant array of independent disks (RAID), in an example embodiment. Persistent storage 105 might be used to store data related to the search results, media (e.g., image files, audio files, and/or video files which might have been received from social-media websites), and models described in greater detail below.

Also connected to persistent storage 105 are the servers in cluster 106, which might run the initialized explore-exploit software described below. In an example embodiment, servers in cluster 106 are also connected through network 101 with website 107 which includes a cluster of servers that host social media (e.g., image files, audio files including container files for streaming, and/or video files including container files for streaming), such as images of celebrities, popular songs, and/or videos of newsworthy events. In an example embodiment, the cluster of servers in website 107 might also be connected (e.g., by a storage area network (SAN)) to persistent storage 108, which stores data related to social media (e.g., image files, audio files including container files for streaming, and/or video files including container files for streaming). Examples of website 107 include Flickr, YouTube, Vimeo, TwitPic, TwitVid, Y Frog image, Y Frog video, MySpace, Allmusic, Pandora, Spotify, etc. In an example embodiment, the servers in cluster 106 and in the cluster at website 107 might also run website software and distributed-computing and/or cloud software.

In an alternative example embodiment, the servers in website 104, cluster 106, website 107, and storage 105 might be hosted wholly or partially off-site in the cloud, e.g., as a platform-as-a-service (PaaS) or an infrastructure-as-a-service (IaaS).

Personal computers 102 and the servers in websites 104 and 107 and cluster 106 might include (1) hardware consisting of one or more microprocessors (e.g., from the x86 family or the PowerPC family), volatile storage (e.g., RAM), and persistent storage (e.g., a hard disk or solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family), volatile storage (e.g., RAM), and persistent storage (e.g., flash memory such as microSD) and (2) an operating system (e.g., Symbian OS, RIM BlackBerry OS, iOS, webOS, Windows Mobile, Android, Linux, etc.) that runs on the hardware.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and mobile device 103 might use browsers (e.g., through a graphical user interface or GUI) to communicate queries to and view search results from search engine software running on the servers at website 104. In an example embodiment, the search engine results might include the images, sound samples, and videos resulting from the software and processes described below. Examples of website 104 include Google, Bing, and Yahoo! Search, among others.

Figure 2:
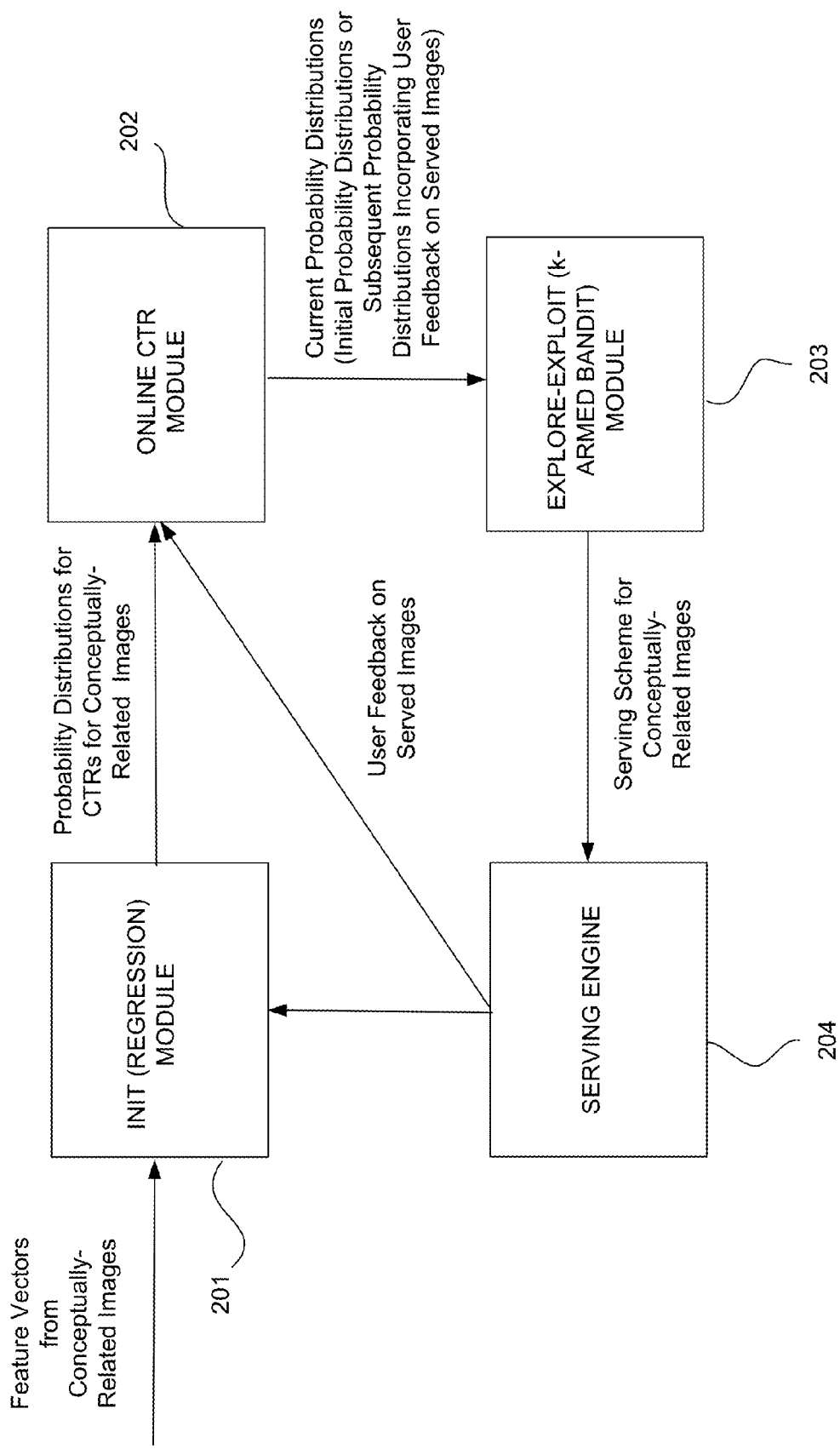
FIG. 2 is a software diagram that illustrates a functional modularization of software for finding engaging images, in accordance with an example embodiment.

FIG. 2 is a software diagram that illustrates a functional modularization of software for finding engaging images, in accordance with an example embodiment. In an example embodiment, the depicted functional modules might execute on the cluster of servers 106 shown in FIG. 1. As depicted in FIG. 2, initialization module 201 is an implementation (e.g., in R programming language) of a regression model (e.g., gradient-boosted decision trees) that has been trained using feature vectors (or other quantitative representations) from conceptually-related images with high click-through rates (e.g., images of the same A-list celebrity). The feature vector might result, for example, from applying a "bag of features" model, SIFT (Scale Invariant Feature Transform), SURF (Speeded Up Robust Feature), or a color histogram to an image which might have been received from a social-media website. Alternatively, the feature vector might include Boolean or enumerated values, e.g., a Boolean indicating whether an image is of a female or a male or whether the image includes cleavage or a man's chest. In alternative example embodiments, the regression model might be based on (1) regression decision trees as implemented using Weka (Waikato Environment for Knowledge Analysis) or (2) support vector regression (SVR) machines, e.g., as implemented using the open-source LibSVM (Library for Support Vector Machines).

It will be appreciated that faceted classification and/or faceted search employs concepts (e.g., aspects, properties, or characteristics of a class or specific subject) to relate objects on multiple dimensions. For example, images of the same person are conceptually-related by the subject of the image. It will also be appreciated that click-through rate (CTR) is a measure of engagingness. And if images have a high CTR, there will be more data on which to base the regression model and consequently the regression model will tend to perform better.

Initialization module 201 receives feature vectors from conceptually-related images and maps them to corresponding probability distributions (e.g., with measures of central tendency and variance) for expected CTRs. In an example embodiment, this might be done offline. Also, in an example embodiment, the conceptually-related images might be images of the same C-list celebrity. In alternative example embodiments, each probability distribution output by initialization model 201 might be a Gaussian distribution, a beta distribution, a gamma distribution, a Poisson distribution, etc.

In an example embodiment, the probability distributions output by initialization module 201 become inputs to online CTR module 202, which maintains the current probability distributions used as inputs for explore-exploit module 203. In an example embodiment, online CTR module might execute online, as suggested by its name. Online CTR module 202 passes the initial probability distributions as inputs to explore-exploit module 203, which might be implemented (e.g., using the R programming language) as a multi-armed (or k-armed) bandit model that employs, e.g., Bayesian inference with Lagrange relaxation. Such multi-armed bandit models are described in (1) co-owned U.S. Published Patent Application No. 2010/0125585 (U.S. application Ser. No. 12/272,607) entitled "Conjoint Analysis with Bilinear Regression Models for Segmented Predictive Content Ranking" filed on Nov. 17, 2008 (hereinafter "Conjoint Analysis"), which is incorporated herein by reference, and (2) the publication, Argawal et al., *Explore/Exploit Schemes for Web Content Optimization*, Ninth IEEE International Conference on Data Mining 2009 (ICDM '09) (hereinafter "Explore/Exploit Schemes"), which is also incorporated herein by reference.

As depicted in FIG. 2, the output of explore-exploit module 203 is a serving scheme for the conceptually-related images. According to the serving scheme (e.g., which might allocate a particular percentage of views to an image or display an image with a particular probability), some or all of the conceptually-related images will be displayed to users by serving engine 204 on web pages displaying faceted search results. In an example embodiment, serving engine 204 gathers user feedback (e.g., mouse clicks) on the served images and inputs the user feedback to online CTR module 202, which incorporates the user feedback into the probability distributions for the served images (e.g., using one of the regression models described above), making them the current probability distributions used as inputs for explore-exploit module 203. In turn, these probability distributions are used to update the explore-exploit module 203, resulting in a revised serving scheme for the served images. In another example embodiment, the user feedback from the serving engine might be used to split initialization module 201 or the online CTR module 202 into multiple models, e.g., using image metadata.

It will be appreciated that a functional modularization similar to FIG. 2 might be used to find engaging sound samples as discussed further below, in one alternative example embodiment. In another alternative example embodiment, a functional modularization similar to FIG. 2 might be used to find engaging videos, as also discussed further below.

Figure 3:
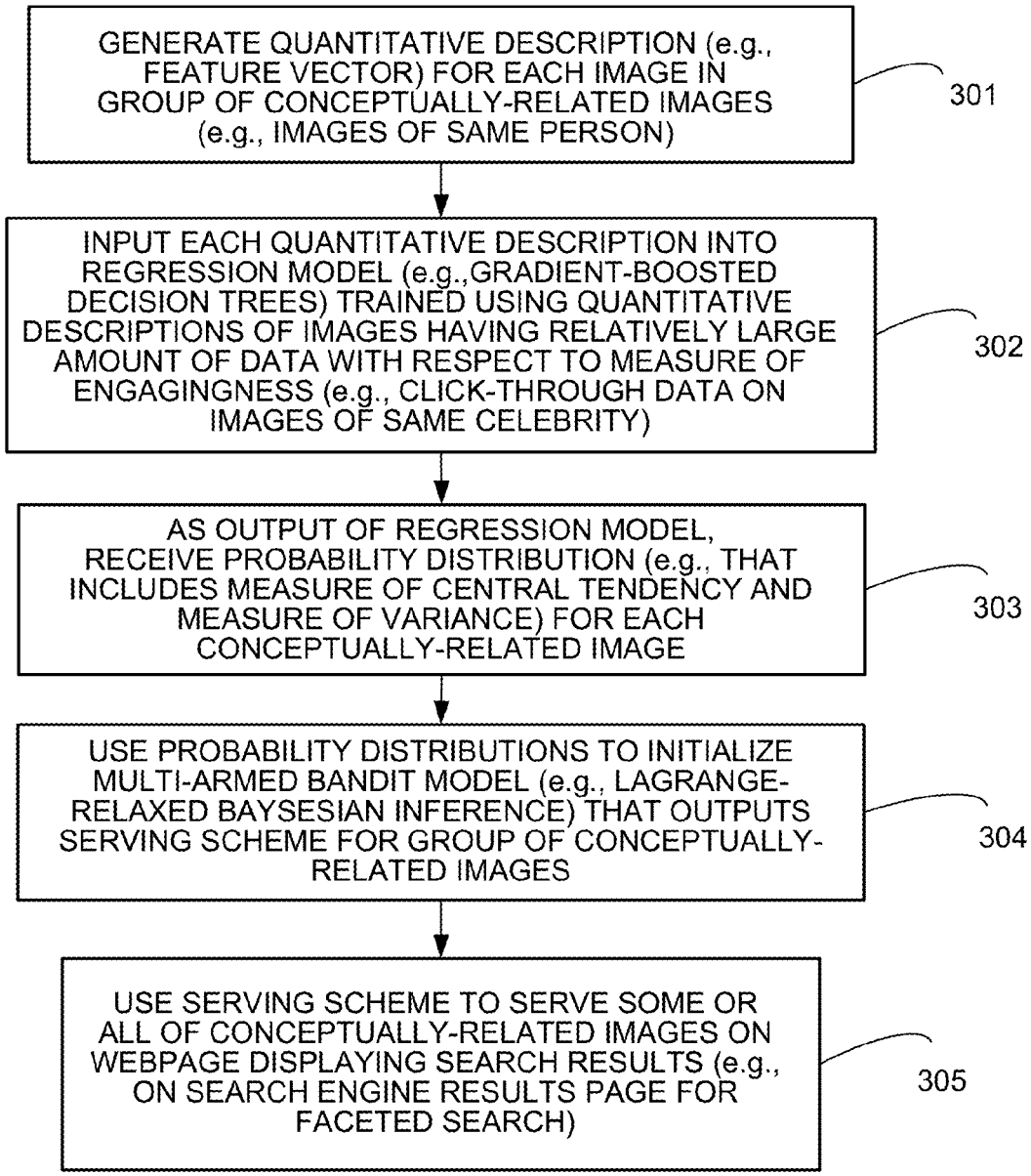
FIG. 3 is a flowchart diagram that illustrates a process for generating engaging images for facets displayed on a search engine results page (SERP), in accordance with an example embodiment.

FIG. 3 is a flowchart diagram that illustrates a process for generating engaging images for facets displayed on a search engine results page (SERP), in accordance with an example embodiment. In an example embodiment, this process might be performed by the initialized explore-exploit software executing on server cluster 106 as shown in FIG. 1. As depicted in FIG. 3, the software generates a quantitative description (e.g., feature vector) for each image in a group of conceptually-related images (e.g., images of same person), in operation 301. As indicated above, the conceptually-related images might have been collected from one or more social-media websites, e.g., using a search engine or a program such as mediaboxAdvanced. In operation 302, the software inputs each quantitative description into a regression model (e.g., gradient-boosted decision trees) trained using quantitative descriptions of images having a relatively large amount of data with respect to a measure of engagingness (e.g., click-through data on images of same celebrity). As an output of the regression model, the software receives a probability distribution (e.g., that includes a measure of central tendency and a measure of variance) for each conceptually-related image, in operation 303. In operation 304, the software uses the probability distributions to initialize a multi-armed bandit model (e.g., an explore-exploit model based on Bayesian inference with Lagrange relaxation) that outputs a serving scheme for the group of conceptually-related images. And in operation 305, the software uses the serving scheme to serve some or all of the conceptually-related images (e.g., as thumbnail images) on a webpage displaying search results (e.g., on a search engine results page for faceted search).

FIG. 4 shows a formula relating to a k-armed bandit model based on Bayesian inference, in accordance with an example embodiment. The formula 401 comes from Explore/Exploit Schemes and assumes a k-armed bandit where k is 2 (e.g., there are two items displayed to viewers) and where there are two intervals (e.g., time 0 and time 1). As explained in Explore/Exploit Schemes, the formula is an equivalence; that is to say, both sides of the formula 401 represent the expected total number of clicks in the two intervals. It will be appreciated that an optimal solution to this formula will find a decision x in the interval [0,1] and a decision $x_1$ in the set of decisions $X_1$ (where $x_1$ and $X_1$ are functions of a random variable c) that maximizes the expected total number of clicks in the two intervals. A decision is a fraction of user visits allocated to a certain item, as noted in the annotation to formula 401 in FIG. 4. It will be appreciated that the decisions x and $x_1$ constitute a "serving scheme", as that term is used elsewhere in this disclosure. When k is greater than 2 (e.g., there are more than 2 items to be displayed to viewers), Lagrange relaxation simplifies the computation of the optimal solution, as also pointed out in Explore/Exploit Schemes.

Figure 5:
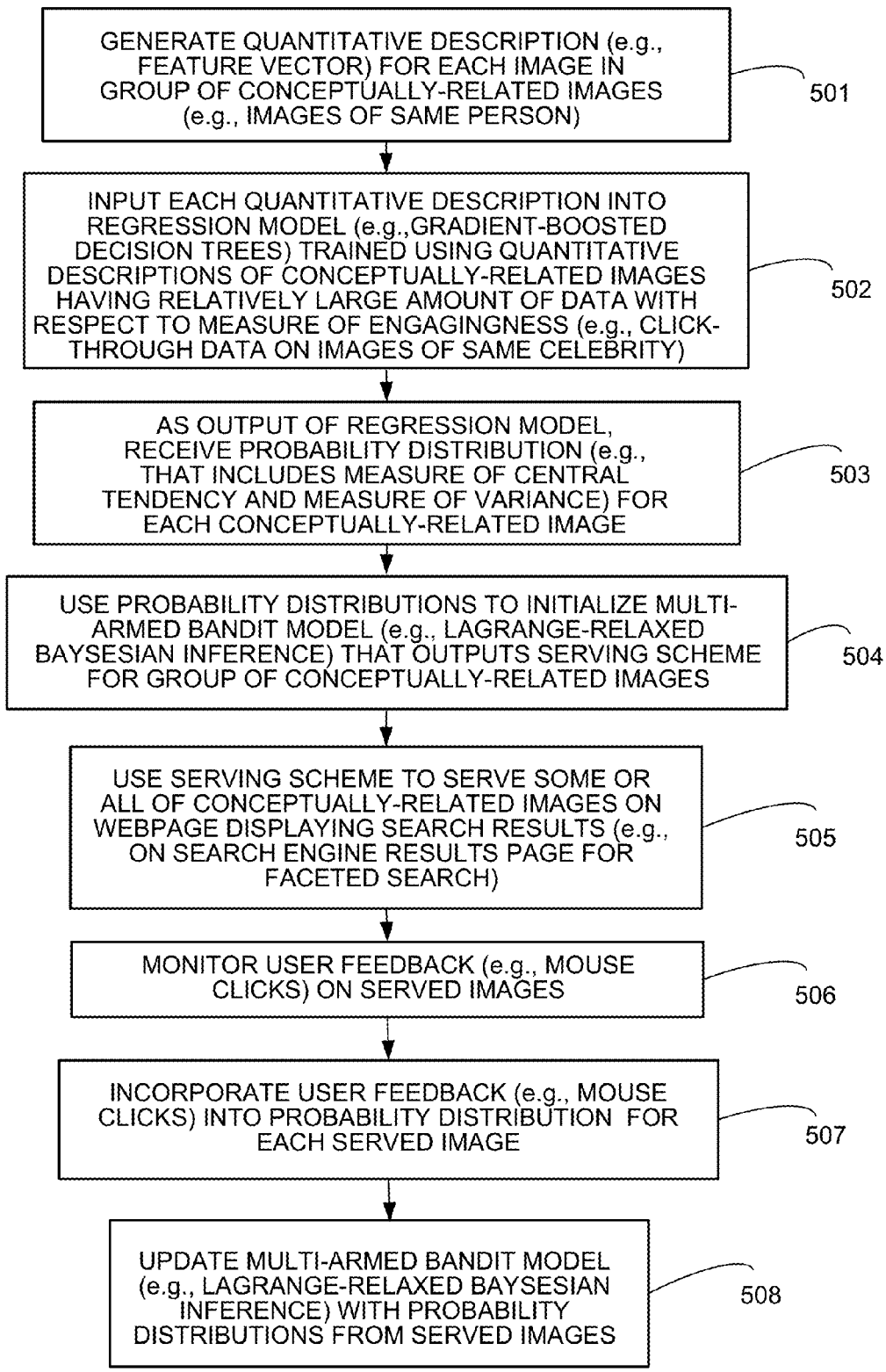
FIG. 5 is a flowchart diagram that illustrates a process, using user feedback, for generating engaging images for facets displayed on a search engine results page (SERP), in accordance with an example embodiment.

FIG. 5 is a flowchart diagram that illustrates a process, using user feedback, for generating engaging images for facets displayed on a search engine results page (SERP), in accordance with an example embodiment. In an example embodiment, this process might be performed by the initialized explore-exploit software executing on server cluster 106 as shown in FIG. 1. As depicted in FIG. 5, the software generates a quantitative description (e.g., feature vector) for each image in a group of conceptually-related images (e.g., images of same person), in operation 501. In operation 502, the software inputs each quantitative description into a regression model (e.g., gradient-boosted decision trees) trained using quantitative descriptions of images having a relatively large amount of data with respect to a measure of engagingness (e.g., click-through data on images of same celebrity). As an output of the regression model, the software receives a probability distribution (e.g., that includes a measure of central tendency and a measure of variance) for each conceptually-related image, in operation 503. In operation 504, the software uses the probability distributions to initialize a multi-armed bandit model (e.g., an explore-exploit model based on Bayesian inference with Lagrange relaxation) that outputs a serving scheme for the group of conceptually-related images. And in operation 505, the software uses the serving scheme to serve some or all of the conceptually-related images (e.g., as thumbnail images) on a webpage displaying search results (e.g., on a search engine results page for faceted search).

In operation 506, the software monitors user feedback (e.g., mouse clicks) on the served images and, in operation 507, the software incorporates user feedback (e.g., mouse clicks) into a probability distribution for each served image, e.g., at online CTR module 202 in FIG. 2. In an alternative example embodiment, the user feedback might be a social signal such as a thumbs-up, like, or plus-one on the SERP or a share (or other post/broadcast such as a tweet) to a stream associated with a profile on social-networking website. In an example embodiment, the software might use a regression model similar to that used in operation 502 to incorporate the user feedback into the probability distributions. In an alternative example embodiment, the software might use a different regression model, e.g., one of the other regression models discussed above, to incorporate the user feedback into the probability distributions. Then in operation 508, the software updates the multi-armed bandit model (e.g., an explore-exploit model based on Bayesian inference with Lagrange relaxation) with the probability distributions from the served images, for use in generating a revised serving scheme for the served images.

Figure 6:
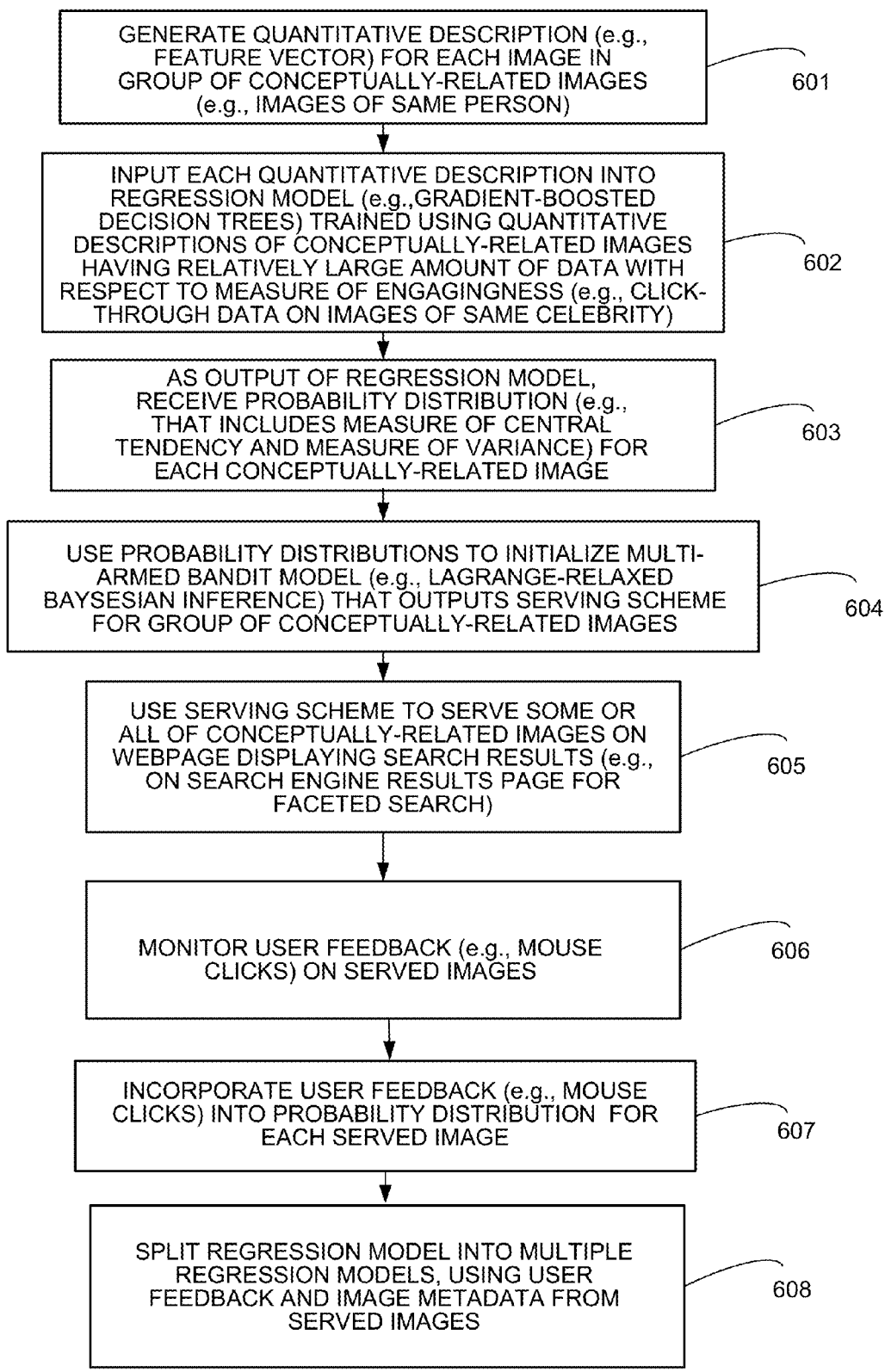
FIG. 6 is a flowchart diagram that illustrates a process using user feedback to split a regression model, in accordance with an example embodiment.

FIG. 6 is a flowchart diagram that illustrates a process for using user feedback to split a regression model, in accordance with an example embodiment. In an example embodiment, this process might be performed by the initialized explore-exploit software executing on server cluster 106 as shown in FIG. 1. As depicted in FIG. 6, the software generates a quantitative description (e.g., feature vector) for each image in a group of conceptually-related images (e.g., images of same person), in operation 601. In operation 602, the software inputs each quantitative description into a regression model (e.g., gradient-boosted decision trees) trained using quantitative descriptions of images having a relatively large amount of data with respect to a measure of engagingness (e.g., click-through data on images of same celebrity). As an output of the regression model, the software receives a probability distribution (e.g., that includes a measure of central tendency and a measure of variance) for each conceptually-related image, in operation 603. In operation 604, the software uses the probability distributions to initialize a multi-armed bandit model (e.g., an explore-exploit model based on Bayesian inference with Lagrange relaxation) that outputs a serving scheme for the group of conceptually-related images. And in operation 605, the software uses the serving scheme to serve some or all of the conceptually-related images (e.g., as thumbnail images) on a webpage displaying search results (e.g., on a search engine results page for faceted search).

In operation 606, the software monitors user feedback (e.g., mouse clicks) on the served images. In operation 607, the software incorporates the user feedback (e.g., mouse clicks) into a probability distribution for each served image, e.g., at online CTR module 202 in FIG. 2. In an alternative example embodiment, the user feedback might be a social signal such as a thumbs-up, like, or plus-one on the SERP or a share (or other post/broadcast such as a tweet) to a stream associated with a profile on social-networking website. In an example embodiment, the software might use a regression model similar to that used in operation 602 to incorporate the user feedback into the probability distributions. In an alternative example embodiment, the software might use a different regression model, e.g., one of the other regression models discussed above, to incorporate the user feedback into the probability distributions. Then in operation 608, the software splits the regression model into multiple regression models, using metadata associated with the served images (e.g., descriptive information including keywords) and the user feedback from the served images. For example, if the metadata indicates that the subject of the served images is a male, the regression model might be split into a regression model for images of males and a regression model for images of females. The multiple regression models might then be used to generate initializing probability distributions from feature vectors extracted from a subsequent group of conceptually-related images.

It will be appreciated that this splitting of the regression model might be applied to initialization module 201 and/or online CTR module 202, in an example embodiment. An alternative example embodiment might provide for another form of "model splitting", e.g., using Bayesian smoothing or shrinkage estimation as described by Pandey and Argawal et al., *Bandits for taxonomies: A model based approach*, In Proceedings of the SIAM International Conference on Data Mining (2007), which is hereby incorporated by reference. Thus, given a pre-defined taxonomy of images (e.g., male and female), the software might use user feedback classified according to that taxonomy to "split" the explore-exploit model into multiple explore-exploit models.

Figure 7:
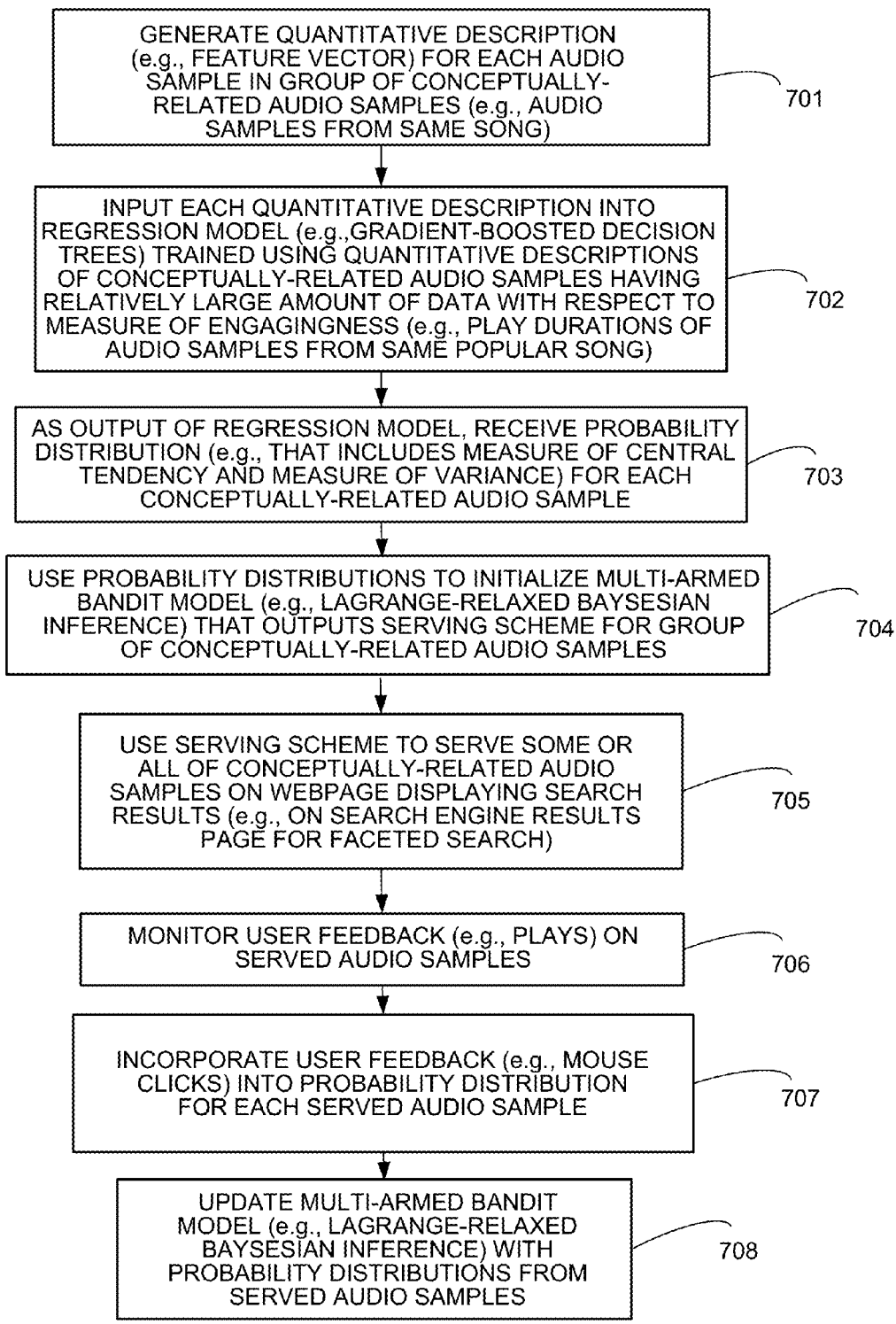
FIG. 7 is a flowchart diagram that illustrates a process, using user feedback, for generating engaging audio samples for facets displayed on a search engine results page (SERP), in accordance with an example embodiment.

FIG. 7 is a flowchart diagram that illustrates a process, using user feedback, for generating engaging audio samples for facets displayed on a search engine results page (SERF), in accordance with an example embodiment. In an example embodiment, this process might be performed by the initialized explore-exploit software executing on server cluster 106 as shown in FIG. 1. As depicted in FIG. 7, the software generates a quantitative description (e.g., a feature vector) for each image in a group of conceptually-related audio samples (e.g., audio samples from the same song), in operation 701. The feature vector might include, for example, MFCCs (Mel-frequency cepstral coefficients) extracted from audio files received from a social-media website. In operation 702, the software inputs each quantitative description into a regression model (e.g., gradient-boosted decision trees) trained using quantitative descriptions of audio samples having a relatively large amount of data with respect to a measure of engagingness (e.g., play durations of audio samples from the same popular song). As an output of the regression model, the software receives a probability distribution (e.g., that includes a measure of central tendency and a measure of variance) for each conceptually-related audio sample, in operation 703. In operation 704, the software uses the probability distributions to initialize a multi-armed bandit model (e.g., an explore-exploit model based on Bayesian inference with Lagrange relaxation) that outputs a serving scheme for the group of conceptually-related audio samples. And in operation 705, the software uses the serving scheme to serve some or all of the conceptually-related audio samples on a webpage displaying search results (e.g., on a search engine results page for faceted search).

In operation 706, the software monitors user feedback (e.g., mouse clicks) on the served audio samples and, in operation 707, the software incorporates user feedback (e.g., mouse clicks) into a probability distribution for each served audio sample, e.g., at online CTR module 202 in FIG. 2. In an alternative example embodiment, the user feedback might be a social signal such as a thumbs-up, like, or plus-one on the SERP or a share (or other post/broadcast such as a tweet) to a stream associated with a profile on social-networking website. In an example embodiment, the software might use a regression model similar to that used in operation 702 to incorporate the user feedback into the probability distributions. In an alternative example embodiment, the software might use a different regression model, e.g., one of the other regression models discussed above, to incorporate the user feedback into the probability distributions. Then in operation 708, the software updates the multi-armed bandit model (e.g., an explore-exploit model based on Bayesian inference with Lagrange relaxation) with the probability distributions from the served audio samples, for use in generating a revised serving scheme for the served audio samples.

It will be appreciated that the process described in FIG. 7 might be used to identify a hook in a song. Generally speaking, a hook is a musical idea (e.g., a short riff, passage, or phrase) which is used in popular music to make a song "catch the ear of the listener". In an alternative example embodiment, some of the operations in the process (e.g., operations 701-704) might be used in software that facilitates song composition rather than in software that generates audio samples for a faceted SERP. Likewise, some of the operations in the process described in FIG. 5 (e.g., operations 501-504) might be used in "profile-picture" software rather than in software that generates images for a faceted SERP.

Figure 8:
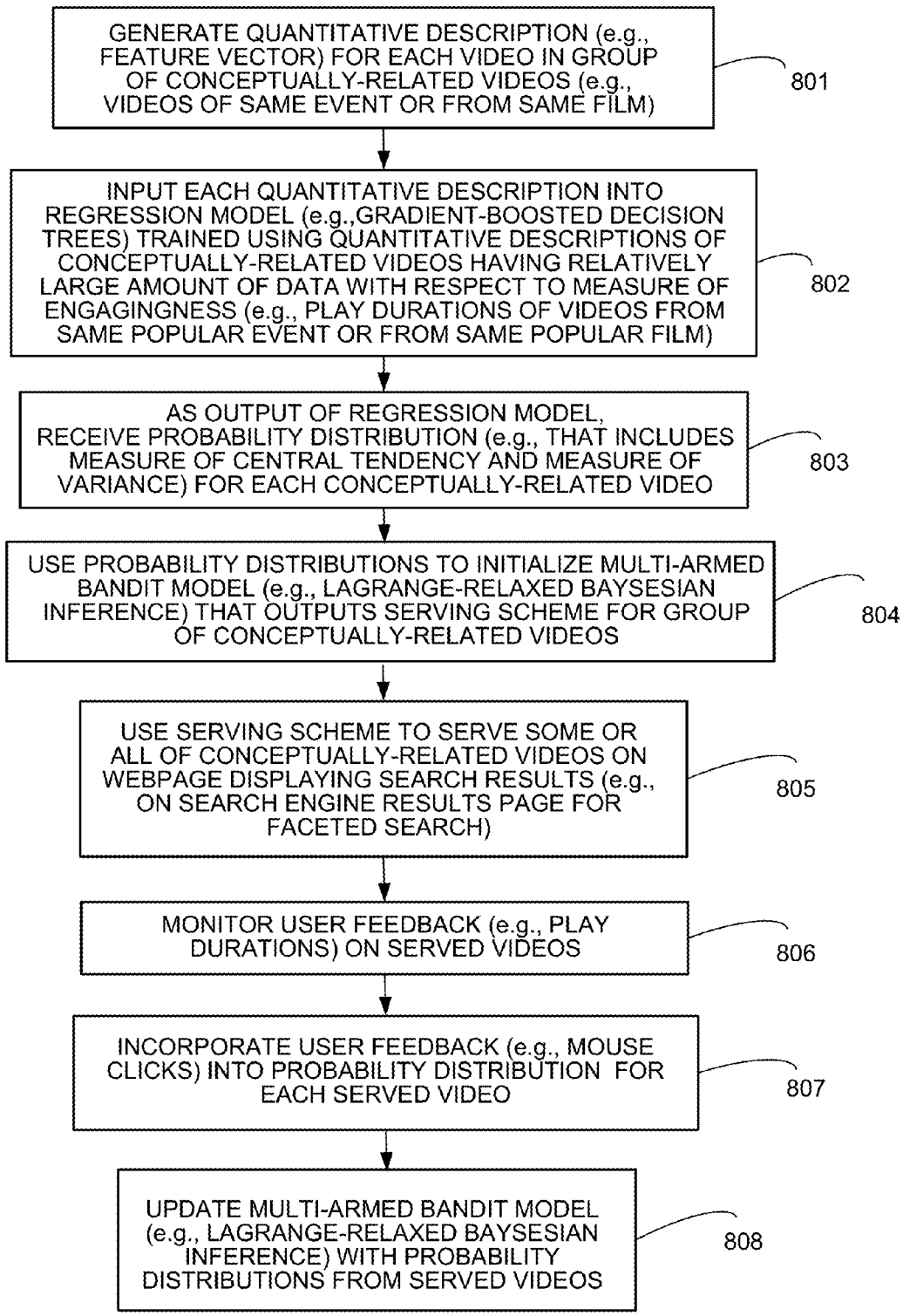
FIG. 8 is a flowchart diagram that illustrates a process, using user feedback, for generating engaging videos for facets displayed on a search engine results page (SERP), in accordance with an example embodiment.

FIG. 8 is a flowchart diagram that illustrates a process, using user feedback, for generating engaging videos for facets displayed on a search engine results page (SERP), in accordance with an example embodiment. In an example embodiment, this process might be performed by the initialized explore-exploit software executing on server cluster 106 as shown in FIG. 1. As depicted in FIG. 8, the software generates a quantitative description (e.g., a feature vector) for each video in a group of conceptually-related videos (e.g., videos of the same event or from the same film), in operation 801. The feature vector might include, for example, image and audio features extracted from container files received from a social-media website. In operation 802, the software inputs each quantitative description into a regression model (e.g., gradient-boosted decision trees) trained using quantitative descriptions of videos having a relatively large amount of data with respect to a measure of engagingness (e.g., play durations of videos of the same popular event or from the same popular film). As an output of the regression model, the software receives a probability distribution (e.g., that includes a measure of central tendency and a measure of variance) for each conceptually-related video, in operation 803. In operation 804, the software uses the probability distributions to initialize a multi-armed bandit model (e.g., an explore-exploit model based on Bayesian inference with Lagrange relaxation) that outputs a serving scheme for the group of conceptually-related videos. And in operation 805, the software uses the serving scheme to serve some or all of the conceptually-related videos on a webpage displaying search results (e.g., on a search engine results page for faceted search).

In operation 806, the software monitors user feedback (e.g., mouse clicks) on the served audio samples and, in operation 807, the software incorporates user feedback (e.g., mouse clicks) into a probability distribution for each served video, e.g., at online CTR module 202 in FIG. 2. In an alternative example embodiment, the user feedback might be a social signal such as a thumbs-up, like, or plus-one on the SERP or a share (or other post/broadcast such as a tweet) to a stream associated with a profile on social-networking website. In an example embodiment, the software might use a regression model similar to that used in operation 802 to incorporate the user feedback into the probability distributions. In an alternative example embodiment, the software might use a different regression model, e.g., one of the other regression models discussed above, to incorporate the user feedback into the probability distributions. Then in operation 808, the software updates the multi-armed bandit model (e.g., an explore-exploit model based on Bayesian inference with Lagrange relaxation) with the probability distributions from the served videos, for use in generating a revised serving scheme for the served videos.

Here again, it will be appreciated that some of the operations in the process described in FIG. 8 (e.g., operations 801-804) might be used in software for composing film trailers rather than in software that generates videos for a faceted SERP.

Figure 9:
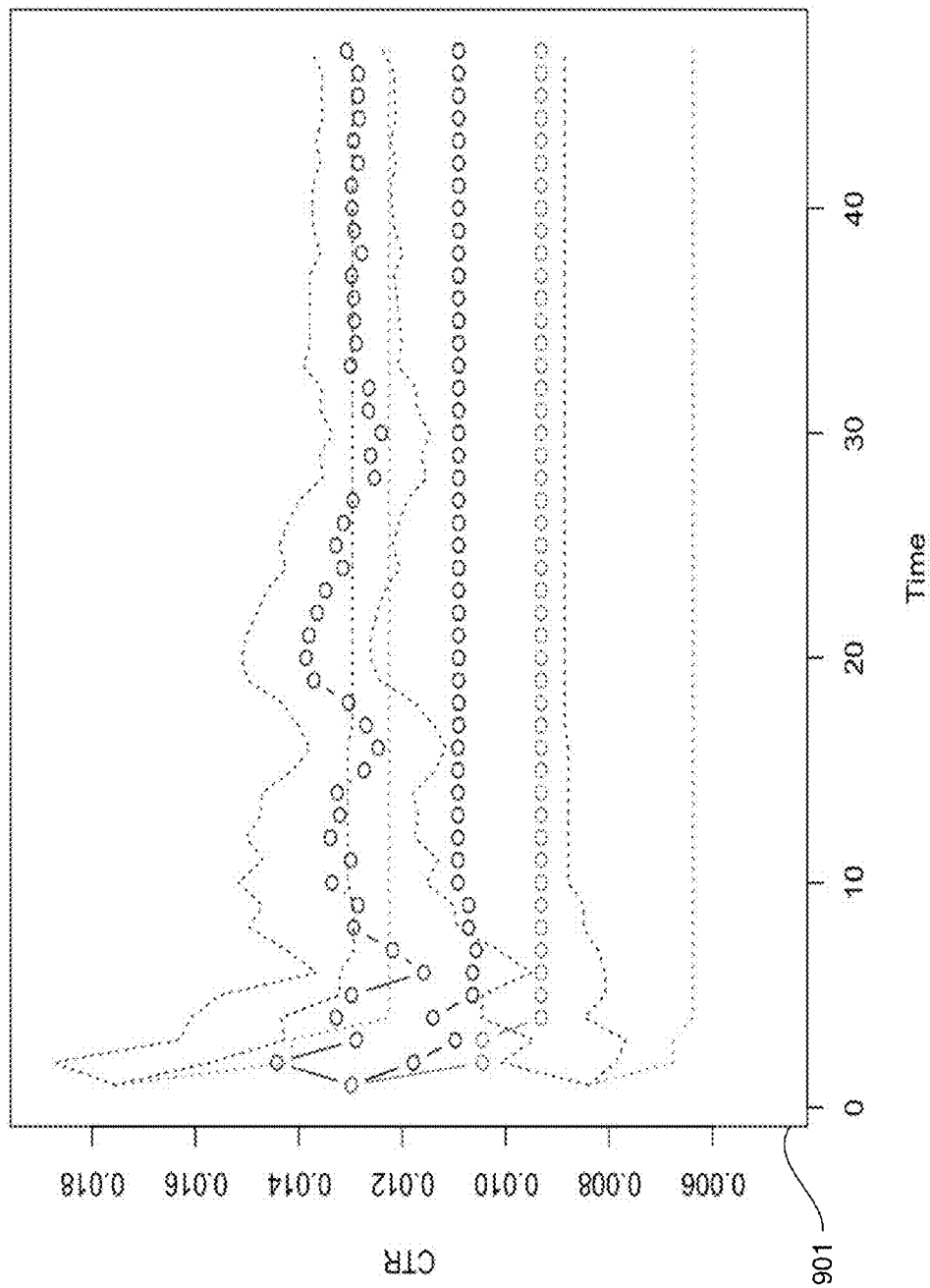
FIG. 9 is a graph showing the relative performance of various multi-armed bandit models, in accordance with an example embodiment.

FIG. 9 is a graph depicting the relative performance of three images input to the process described in FIG. 5, in accordance with an example embodiment. The three images were of the same A-list celebrity. In graph 901, the horizontal axis represents time in days and the vertical axis represents estimated CTR (e.g., as output by the online CTR module 202 and received as an input by the explore-exploit module 203 in FIG. 2). Also, in graph 901, the circles represent estimated CTRs and the dashes represent their corresponding estimated standard deviations. At time 0, all three images have the same estimated CTR, namely, approximately 0.013. However, as days pass, the estimated CTR for the image represented by the topmost series of circles converges on that value, whereas the estimated CTR for the image represented by the bottommost series of circles is so low (approximately 0.009) that it is no longer shown to viewers after a few days. Similarly, after approximately 10 days, the estimated CTR for the image represented by the middle series of circles is relatively poor, at approximately 0.010, and it, too, is no longer shown to viewers. It will be appreciated that as the images are shown to more and more viewers as the days pass, the click-through data for the images grows. And consequently, the estimated standard deviations of the estimated CTRs decline over time; that is to say, the estimates improve.

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, some or all of the processes described above might be used with software for reinforcement learning that is not based on explore-exploit or multi-arm bandit models. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising operations of:
    creating a first plurality of probability distributions from a plurality of images that are distinct, wherein each of the probability distributions is generated by inputting a quantitative description of one or more features associated with one of the plurality of images into a regression model that outputs a probability distribution for a measure of engagingness for that image and wherein each of the plurality of images is conceptually related to the other images;
    using the first plurality of probability distributions to initialize a multi-armed bandit model that outputs a serving scheme for each of the images;
    serving at least one of the images on a web page displaying search results, based at least in part on the serving scheme;
    monitoring user feedback on the at least one served image;
    creating a second plurality of probability distributions based at least in part on the user feedback;
    updating the multi-armed bandit model with the second plurality of probability distributions; and
    splitting the regression model into two or more regression models, based at least in part on the user feedback for the at least one served image and image metadata associated with the at least one served image, wherein each of the operations is executed by one or more processors.

2. The method of claim 1, wherein the search results are produced by a facted search engine.

3. The method of claim 1, wherein the user feedback is a share to a stream associated with a profile on a social-networking website.

4. The method of claim 2, wherein the user feedback is a mouse click.

5. The method of claim 1, wherein the measure of engagingness is click-through rate (CTR).

6. The method of claim 1, wherein the multi-armed bandit model employs Bayesian inference with Lagrange relaxation.

7. The method of claim 1, wherein the regression model is trained using images of celebrities.

8. The method of claim 1, wherein the regression model is based on gradient-boosted decision trees.

9. The method of claim 1, wherein the quantitative representation is a feature vector.

10. A computer-readable storage medium persistently storing a program, wherein the program, when executed, instructs a processor to perform the following operations:
    create a first plurality of probability distributions from a plurality of images that are distinct, wherein each of the probability distributions is generated by inputting a quantitative description of one or more features associated with one of the plurality of images into a regression model that outputs a probability distribution for a measure of engagingness for that image and wherein each of the plurality of images is conceptually related to the other images;
    use the first plurality of probability distributions to initialize a multi-armed bandit model that outputs a serving scheme for each of the images;
    serve at least one of the images on a web page displaying search results, based at least in part on the serving scheme;
    monitor user feedback on the at least one served image;
    create a second plurality of probability distributions based at least in part on the user feedback;
    update the multi-armed bandit model with the second plurality of probability distributions; and
    split the regression model into two or more regression models, based at least in part on the user feedback for the at least one served image and image metadata associated with the at least one served image.

11. The computer-readable storage medium of claim 10, wherein the search results are produced by a facted search engine.

12. The computer-readable storage medium of claim 10, wherein the user feedback is a share to a stream associated with a profile on a social-networking website.

13. The computer-readable storage medium of claim 11, wherein the user feedback is a mouse click.

14. The computer-readable storage medium of claim 10, wherein the measure of engagingness is click-through rate (CTR).

15. The computer-readable storage medium of claim 10, wherein the multi-armed bandit model employs Bayesian inference with Lagrange relaxation.

16. The computer-readable storage medium of claim 10, wherein the regression model is trained using images of celebrities.

17. The computer-readable storage medium of claim 10, wherein the regression model is based on gradient-boosted decision trees.

18. The computer-readable storage medium of claim 10, wherein the quantitative representation is a feature vector.

19. A method, comprising the operations of:
    creating a first plurality of probability distributions from a plurality of videos that are distinct, wherein each of the probability distributions is generated by inputting a quantitative description of one or more features associated with one of the plurality of videos into a regression model that outputs a probability distribution for a measure of engagingness for that video and wherein each of the plurality of videos is conceptually related to the other videos;

using the first plurality of probability distributions to initialize a multi-armed bandit model that outputs a serving scheme for each of the videos;

serving at least one of the videos on a web page displaying search results, based at least in part on the serving scheme;

monitoring user feedback on the at least one served video; and creating a second plurality of probability distributions based at least in part on the user feedback;

updating the multi-armed bandit model with the second plurality of probability distributions; and splitting the regression model into two or more regression models, based at least in part on the user feedback for the at least one served image and image metadata associated with the at least one served image, wherein each of the operations is executed by one or more processors.

20. The method of claim 19, wherein the search results are produced by a facted search engine.

* * * * *